No. 707,363. Patented Aug. 19, 1902.
E. L. SLOCUM.
GALVANIC BATTERY.
(Application filed July 1, 1901. Renewed July 23, 1902.)
(No Model.)
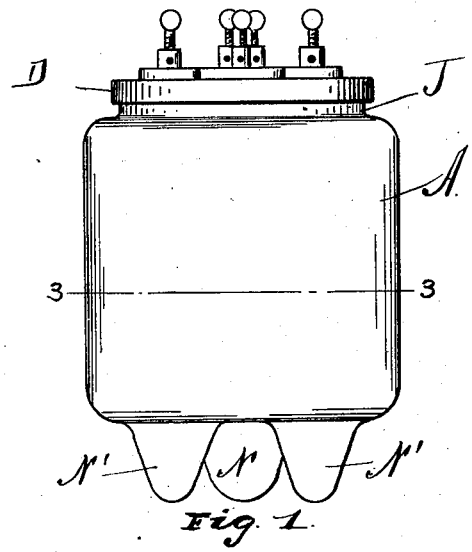
Fig. 1.
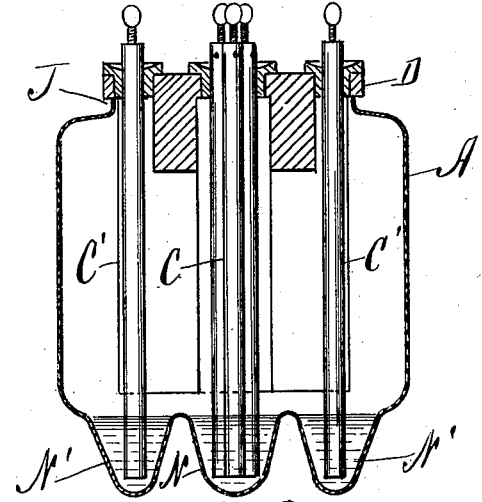
Fig. 2.
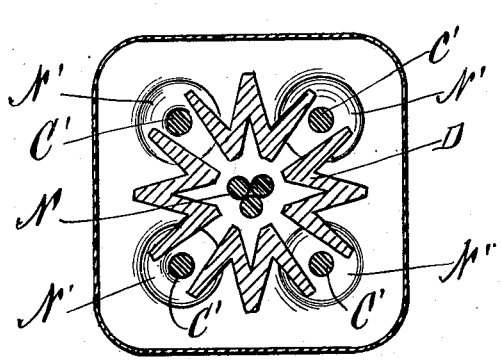
Fig. 3.
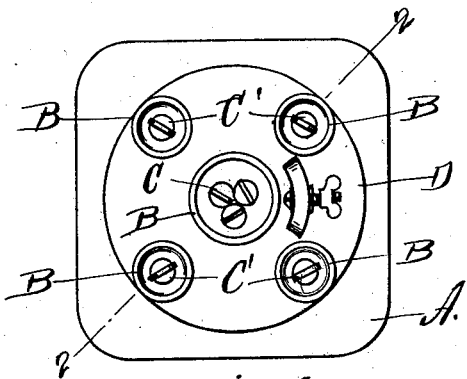
Fig. 4.
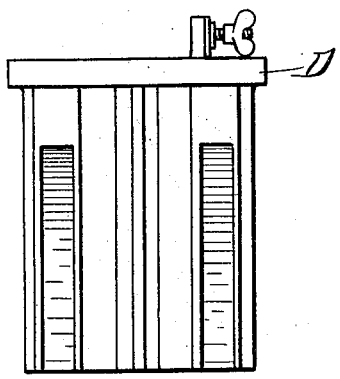
Fig. 5.
Fig. 6.
Witnesses.
Inventor.

UNITED STATES PATENT OFFICE.

EASON L. SLOCUM, OF PAWTUCKET, RHODE ISLAND.

GALVANIC BATTERY.

SPECIFICATION forming part of Letters Patent No. 707,363, dated August 19, 1902.

Application filed July 1, 1901. Renewed July 23, 1902. Serial No. 116,693. (No model.)

*To all whom it may concern:*

Be it known that I, EASON L. SLOCUM, a resident of the city of Pawtucket, in the county of Providence and State of Rhode Island, have invented certain new and useful Improvements in Galvanic Batteries, of which the following is a specification.

This invention relates to the class of galvanic batteries that use a negative element of carbon and a positive element of zinc, and is an improvement on the invention disclosed in the United States patent issued to me December 18, 1900, No. 664,362.

It has for its object to increase the power of the battery mainly by the relative increase in the surface of the carbon or negative element and its closer approximation to the positive element, so as to more completely surround it. It also makes a more compact arrangement and provides means for changing the character of the current produced by the battery.

It is fully explained and illustrated in this specification and the annexed drawings.

Figure 1 represents the battery in side elevation. Fig. 2 shows a vertical section down through the center on line 2 2 in Fig. 4. Fig. 3 shows a horizontal section of the battery, taken on line 3 3 in Fig. 1. Fig. 4 is a top view of the battery. Fig. 5 represents a side elevation of the negative or carbon element. Fig. 6 shows an inside plan view of the bottom of the glass jar.

The construction of my improved battery is as follows:

A is the containing-jar, which I make of glass or other like material and usually in a rectangular shape, with the corners neatly rounded for convenience in molding and also in cleansing it after having been in use. It has a circular neck of rim J, raised on its top, that forms the support for the negative or carbon element D, and the bottom of the jar is made in the form of cups N N', one of which, N, is put in the center to receive the lower end of the center positive element or zinc rod C, (see Fig. 2,) and the other cups, N' N', are made around the center cup, (see Fig. 3,) so as to receive the lower ends of the side positive or zinc elements C'. These cups are for the well-known purpose of holding quicksilver to amalgamate the zinc rods C. The use of a separate cup for each positive electrode has a great advantage, for by a proper arrangement of the wires from each zinc element, so as to use them collectively or separately, the battery may be worked to produce a current of quantity or intensity, or one or more of the zinc elements may be used alone and a battery of great range of capacity produced.

The carbon negative element D is made in four divisions, each division in cross-section being in the shape of the letter W, so as to form inside and outside ribs with grooves between them, which materially increase the surface for the action of the exciting fluid. These four divisions are arranged around a center space and connected to or made in one piece with a top plate of carbon that is large enough to extend over and rest upon the neck J of the jar A. Openings B B' are made in the top plate of the carbon element D, one B in the center for the zinc bars C, constituting the center positive electrode, and B', one over each of the four spaces between the divisions of the carbon element. (See Fig. 3.) The zinc electrodes are held in these openings in the carbon-cap in non-conducting bushings, as described in my patent before mentioned. The zinc elements being placed in the spaces between the divisions of the carbon, the surfaces of the latter surround them more completely, whereby the resistance is decreased, and consequently the action of the battery is materially increased.

Having thus described my improvements, what I claim as my invention, and desire to secure by Letters Patent, is—

1. In a galvanic battery a carbon or negative element made in four divisions, each division having in cross-section the form of a letter W forming ribs on both the outside and inside of the carbon in combination with zinc elements held in the spaces between the divisions, and a containing-jar, substantially as described.

2. In a galvanic battery the combination of a plurality of positive elements, a containing-jar having a separate amalgamating-cup for each positive element made in its bottom, a carbon element made in four divisions, each division having in cross-section the form of a letter W with said positive or zinc elements held in the spaces between said divisions, substantially as described.

3. In a galvanic battery, a carbon element composed of inside and outside vertical ribs separated into sections and joined together at the top the whole having a hollow center, the zinc electrodes in combination with a suitable jar for containing said carbon and the zinc electrodes, substantially as described.

4. In a galvanic battery, a carbon element with a hollow center, inwardly and outwardly extending vertical ribs, tapering in cross-section, separated into two or more sections joined together at the top in combination with a jar having a plurality of cups in its lower end, a plurality of positive electrodes or zinc rods held in said cups substantially as described.

5. In a galvanic battery, a jar having its bottom made of a plurality of cups, a carbon element with a hollow center, a series of internal and external vertical ribs, joined together at their upper ends and divided at their lower parts into groups, in combination with a plurality of positive elements set between said ribs with their lower ends extending down into said cups substantially as described.

In testimony whereof I have hereunto set my hand this 29th day of June, A. D. 1901.

EASON L. SLOCUM.

In presence of—
HARRY J. GARCEAU,
ANDREW J. PITCHER.